United States Patent [19]

Braschler et al.

[11] 4,454,520

[45] Jun. 12, 1984

[54] ELECTROGRAPHIC RECORDER WITH ENHANCED WRITING SPEED

[75] Inventors: Boyce D. Braschler, Littleton; Paul A. Diddens; Roger D. Erickson, both of Denver; Charles J. O'Toole, Jr., Aurora, all of Colo.

[73] Assignee: Honeywell Inc., Minneapolis, Minn.

[21] Appl. No.: 391,799

[22] Filed: Jun. 24, 1982

[51] Int. Cl.$^3$ .............................................. G01D 15/06

[52] U.S. Cl. .................................. 346/153.1; 346/155

[58] Field of Search ............................ 346/153.1, 155; 118/657–658; 430/48, 122; 358/300

[56] References Cited

U.S. PATENT DOCUMENTS 3,133,834 5/1964 Sowink .
3,455,276 7/1969 Anderson .
3,816,840 6/1974 Kotz .
3,879,737 4/1975 Lunde .
3,914,771 10/1975 Lunde .
3,946,402 3/1976 Lunde .
4,101,909 7/1978 Solmon et al. .
4,218,691 8/1980 Fujii .
4,284,031 8/1981 Thaxter .
4,316,198 2/1982 Erickson ...................... 346/153.1 X
4,364,071 12/1982 Shafer ............................. 346/153.1

*Primary Examiner*—Thomas H. Tarcza
*Attorney, Agent, or Firm*—Charles J. Ungemach

[57] ABSTRACT

An improvement in electrographic recorders to increase the speed of writing that is possible by utilizing a magnetic member behind the paper and by preventing writing signals to occur until the toner is in such a position that writing is possible.

11 Claims, 9 Drawing Figures

FIG. 1
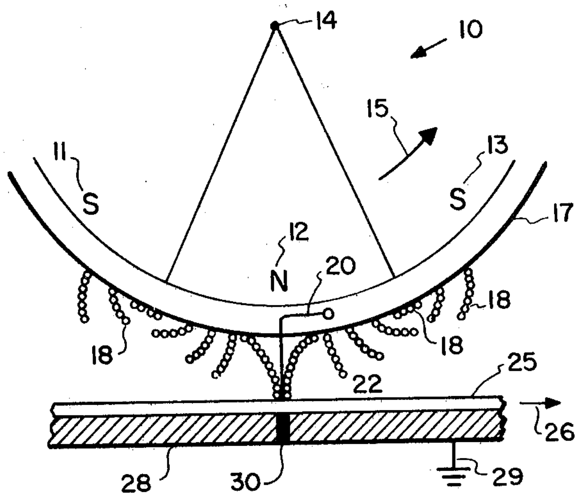
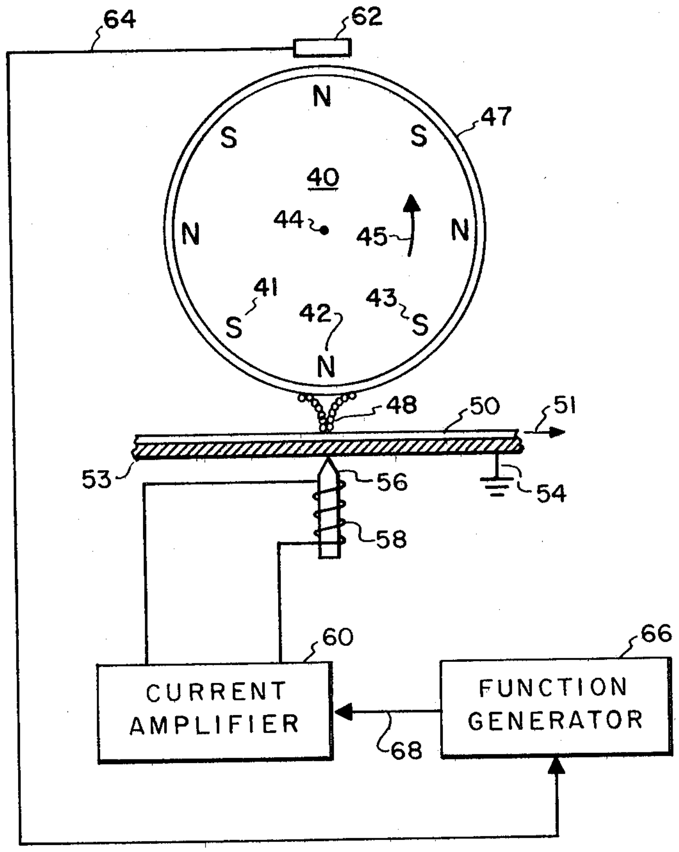
FIG. 2

ELECTROGRAPHIC RECORDER WITH ENHANCED WRITING SPEED

BACKGROUND OF THE INVENTION

In an electrographic recorder of the type described in the Kotz U.S. Pat. No. 3,816,840 issued June 11, 1974 and the Lunde U.S. Pat. No. 3,879,737 issued Apr. 22, 1975, a rotating magnet operates in conjunction with magnetic toner particles and a moving recording medium such as paper to leave marks or dots of toner on the paper which, desirably, appear as a continuous trace or line thereon. More specifically, the rotating magnet is placed within a shell and magnetic toner particles are placed around the shell. The paper travels near the shell over a conductive nonmagnetic surface. A stylus is placed adjacent the paper on the shell and each time a "north" or "south" pole of the rotating magnet is in the vicinity of a stylus, the magnetic toner particles form a "tree" which bridges the gap between the shell and the paper so that the toner particles touch the paper. When a source of voltage of sufficient magnitude is connected between the stylus and the conductive surface, the magnetic force holding the toner particles to the shell is overcome and a few of the particles attach to the paper as a "dot" which is later permanently "fixed" thereto.

Unfortunately, the toner particles only form a "tree" that bridges the gap to the paper when the "north" or "south" poles of the rotating magnet are in the vicinity. Between the poles, the toner particles "lie down" and it is not possible to leave a mark or "dot" on the paper.

It has been found that the tree is formed about fifty percent of the time in the prior art devices while the toner lies down about fifty percent of the time. Since it is desirable to leave a series of dots on the paper which are touching one another to produce a continuous line, the speed at which the paper moves is somewhat restricted. More particularly, $V_{max}=df$ where $V_{max}$ is the maximum velocity of the paper to allow the edges of the dots to touch, d is the linear distance across the dots (they may not be circular) and f is the frequency of pole passages of the rotating magnet. Because of mechanical limitations, f is a very real and limiting value so that the paper velocity may have a practical limit of less than ten inches per second for low resolution to less than three inches per second for high resolution. With lower paper speeds, the dots will more and more overlap which is desirable but with higher paper speeds, significant gaps appear between dots which is undesirable.

SUMMARY OF THE INVENTION

The present invention overcomes the problems of the prior art in several ways. We have discovered that by placing a small magnetically permeable member on the other side of the paper from the rotating magnet and the shell, the lines of force of the rotating magnet can be forced in a more vertical direction to a point where the toner particles bridge the gap to the paper for up to about 75 percent of the time instead of 50 percent as in the prior art.

We have also discovered that if the magnetically permeable member is replaced by an electromagnet and if the current to the coils of the electromagnet is shaped in accordance with a function of the rotating field, the toner particles bridge the gap to the paper for up to about 90 percent of the time depending on the strength of the field.

The width of the magnetically permeable member or the top of the electromagnet should be about the same width as the mark to be left on the paper by the toner. If it is much larger, then the field will be spread out and the size of the dot of toner will undesirably increase. The use of these magnetic devices on the other side of the paper from the rotating magnet also produces the desirable effect of reducing the background because the toner is constrained with stronger forces making it more difficult for toner to be removed by friction. Further, the focusing of toner particles with a small magnetic member behind the paper improves the longitudinal resolution when writing.

Finally, we have discovered that when writing signals are sent to the stylus during a time when the toner particles are lying down, they can be delayed until the gap bridging "tree" is again formed and then be applied to produce a dot on the paper. While the delayed dot will be slightly displaced from its desired position, with overlapping dot recording no gap will occur. Thus in this fashion, one can further increase the rate at which dots can be recorded.

BRIEF DESCRIPTION OF THE DRAWINGS

FIG. 1 is a schematic representation of a partial vertical cross-section of an electrographic recorder showing the magnetically permeable member of the present invention;

FIG. 2 is a schematic representation of a partial vertical cross-section of an electrographic recorder showing the electromagnet of the present invention;

DETAILED DESCRIPTION OF THE PREFERRED EMBODIMENT

Figure 3:
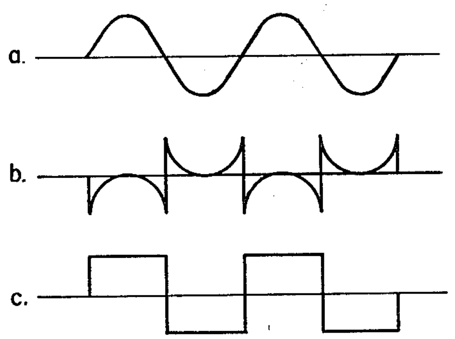
FIG. 3 is a graph showing the wave shapes of signals used in connection with FIG. 2.

Referring to FIG. 1, a partial sectional view of an electrographic recording apparatus is shown in which a rotating magnet 10 having north and south spaced poles, as shown by reference numerals 11, 12 and 13, is rotating about an axis 14 in a direction shown by arrow 15.

A nonmoving shell 17 is spaced peripherally around the rotating magnet 10 and has on its surface toner particles such as shown by reference numeral 18. The toner particles are magnetic and as such tend to assume positions along the surface 17 in accordance with the lines of magnetic force from the rotating magnet 10. Accordingly, the toner tends to stand up and be substantially perpendicular to the surface 17 adjacent to the positions of the north and south poles and tends to lie down along the surface 17 in areas half way between the north and south poles.

A probe or stylus 20 is shown extending through the surface of shell 17 at its lowest point and, at the time shown in FIG. 1, is directly under the north pole 12. With the stylus protruding through the shell, the toner particles form a v-shaped arrangement or "tree" as shown at reference numeral 22.

A web of recording material such as paper 25 is shown lying near the shell 17 and moveable in a direction shown by arrow 26. The paper 25 moves along a conductive, nonmagnetic, surface 28 which is grounded as at 29 so as to be able to form a circuit between the probe or stylus 20 and ground. As seen in FIG. 1, the tree 22 touches paper 25 and is capable of depositing some of the toner particles on the paper when a sufficiently large electric signal is presented to the probe 20. The operation of the electrographic recorder is more completely explained in the above-referred to U.S. Pat. Nos. 3,816,840 and 3,879,737.

The difficulty which has been encountered with the prior art electrographic recorders is that the tree 22 only touches the paper 25 when a north or south pole is in the vicinity directly above the stylus 20. At other times, when the stylus lies beneath the area between poles, the particles lie down and do not touch the paper and recording is not possible. More particularly, it has been found that the tree 22 only touches the paper about 50 percent of the time while the other 50 percent of the time the particles are bending over or lying down and not touching the paper. Under these circumstances, the application of electric signals to the stylus 20 will cause a deposit of toner particles on the paper 25 only 50 percent of the time. Because of this, the paper 25 must move very slowly in order for the dots which are left by the toner particles on the paper to be touching or overlapping one another. If the paper moves faster than the speed necessary to have touching dots, there will be gaps between adjacent dots of toner material producing an undesirable noncontinuous effect.

In accordance with one of the embodiments of the present invention, a magnetically permeable member 30 is inserted into the conductive nonmagnetic material 28 to cause the magnetic lines of force to assume a more vertical direction as the magnet 10 rotates so that the toner tree 22 remains in contact with the paper 25 for a longer period of time. It should be noted that the size of the magnetically permeable member 30 is approximately the size of the area that the toner tree 22 touches the paper. If the magnetically permeable member 30 were larger, then the lines of force would spread and cause the toner tree to touch the paper over a larger area and produce an undesirably large dot. As explained above, the addition of the magnetically permeable member 30 increases the length of time that the recording can occur up to approximately 75 percent instead of the 50 percent available in the prior art. This will allow considerably increased paper speeds and still have the adjacent dots touching to form a continuous line. Also as explained above, the addition of the magnetically permeable member 30 produces the desirable effect of reducing the background because the toner is constrained with stronger forces making it more difficult for toner to be removed by friction and also results in greater focusing of the toner particles which improves the longitudinal resolution when writing.

It should be understood that in an electrographic recorder, a large plurality of styli such as stylus 20 are arranged in the shell 17 vertically into the plane of the paper of FIG. 1 so as to be able to write over the entire surface of a normal sized sheet of paper 25. The magnetically permeable member 30 maybe duplicated behind each of the positions of each of the styli although it will probably be more convenient to place a single magnetically permeable strip extending from one side of the shell 17 to the other underneath all of the styli.

FIG. 2 shows an alternate embodiment of the present invention in which a rotating magnet 40 having alternate north and south poles, such as shown by reference numerals 41, 42 and 43, is rotating about an axis 44 in a direction shown by arrow 45. Magnet 40 is surrounded by a shell 47 which has a coating of magnetic toner particles thereon so as to form a tree 48 between the shell 47 and a recording medium 50 moving in a direction shown by arrow 51. The recording medium 50 travels over a conductive, nonmagnetic plate 53 which is grounded as at 54 so that, as explained above, magnetic toner particles from tree 48 can be deposited on paper 50 when a signal is presented to the stylus underneath the tree 48.

Instead of a magnetically permeable member or strip shown in FIG. 1, FIG. 2 utilizes an electromagnet having a core 56 located beneath the tree 48 on the other side of paper 50 and surface 53 from the rotating magnet 40. The core 56 is energized by a winding 58 which receives its power from a current amplifier 60. A monitor 62, which may be a hall effect sensor, is mounted adjacent the rotating magnet 40 and shell 47 at the top thereof and operates to produce a signal on a conductor 64 representative of the position of the magnetic poles such as 41, 42 and 43. In other words, the signal on conductor 64 will vary from a high value when directly adjacent a north pole to a low value when directly adjacent a south pole passing through zero when adjacent the halfway position between poles. Curve a in FIG. 3 shows how the signal on line 64 would vary. In FIG. 2, the signal on conductor 64 is presented to a function generator 66 which operates to produce an output on a conductor 68 to the current amplifier 60. As will be described in greater detail below, function generator 66 will produce an output signal of such a shape as to result in a varying magnetic field between the rotating magnet and electromagnet which is a substantially square wave. In other words, since the magnets are on opposite sides of the paper 50, the inverse of curve b in FIG. 3 when added to curve a will produce curve c when added to the signal on line 64. In FIG. 2, the current amplifier 60 amplifies the signal on line 68 which is of the shape shown by curve b of FIG. 3 so as to drive the coil 58 of the electromagnet in accordance therewith. As a result, the magnetic field between the rotating magnet 40 and the electromagnet core 56 will be the substantially square wave shown by curve c of FIG. 3 with the result that the tree 48 will stand up for most of the time during the rotation of magnet 40 and will flip over when the area halfway between the north and south poles passes near the stylus. It has been found that by using the concepts of FIG. 2, the duty cycle for writing can be increased to approximately 90 percent of the time thus greatly increasing the paper speed possible.

Figure 4:
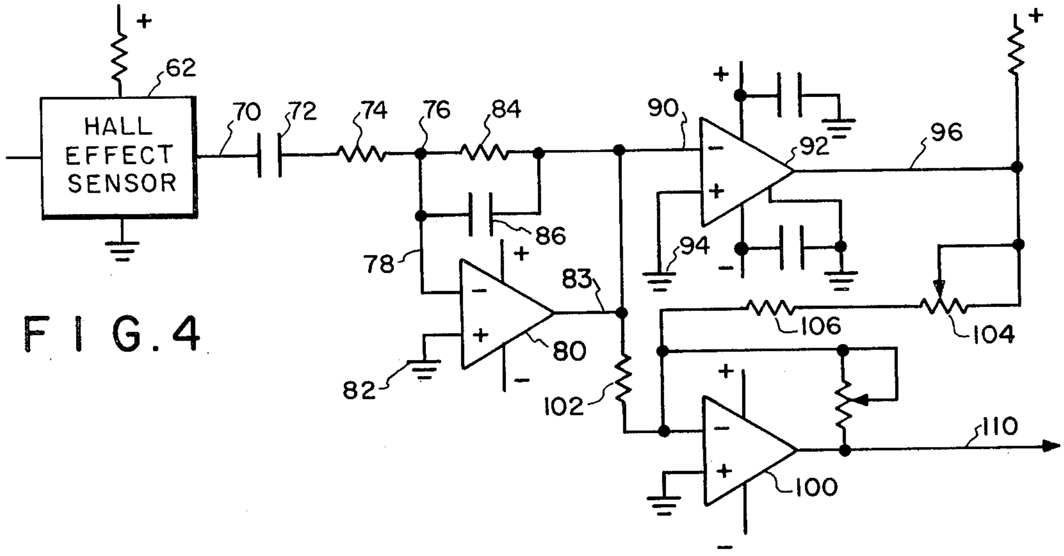
FIG. 4 is a schematic diagram of the function generator of FIG. 2.

FIG. 4 shows the function generator circuit of FIG. 2 including the hall effect sensor 62 whose output, as mentioned above, is like a sine wave of curve a in FIG. 3. This signal is presented on a conductor 70 and through a capacitor 72 and a resistor 74 to a junction point 76 which is connected by a conductor 78 to the upper or negative input of an amplifier 80 whose other input is grounded as at 82. Amplifier 80 is an inverting amplifier having an output on a conductor 83. The output 83 is fed back to the input 76 through a resistor 84 and capacitor 86 combination. Output 83 is also connected by a conductor 90 to the upper or negative input terminal of a comparator 92. The positive or lower input terminal of comparator 92 is shown connected to ground as at 94. Comparator 92 acts as a zero crossing detector and produces an output on a conductor 96 which approximates a square wave of opposite sense to the output from amplifier 80 which, as mentioned, is approximate a sine wave generated by the hall effect sensor. The two signals; i.e. the sine wave on conductor 83 and the oppositely second square wave on conductor 96, are added and presented to the upper input of a second amplifier 100 whose lower input is connected to ground. More particularly, the sine wave signal on conductor 83 is presented through a resistor 102 to the upper input of amplifier 100 while the square wave signal on conductor 96 is presented through a variable resistor 104 and a fixed resistor 106 to the upper input of amplifier 100. Resistors 102, 104 and 106 are sized to cause the signals to amplifier 100 to be of comparable magnitudes so that when added, they will produce a resultant signal which varies around zero the same amount in both directions.

By this addition process, the input to amplifier 100 has a wave shape which is the inverse of that shown by curve b of FIG. 3 and since amplifier 100 is also an inverting amplifier, the output thereof on conductor 100 has the desired shape to supply the electromagnet of FIG. 2. Accordingly, the signal on conductor 110 will be used to supply the current amplifier 60 of FIG. 2.

In order to assure that the recording apparatus of FIG. 1 or FIG. 2 produces a series of dots of toner that are at least touching and preferably overlapping, it is necessary to cause the signal to the stylus, such as 20, to occur at periodic intervals adjusted in accordance with the speed in which the paper is moving.

Figure 5:
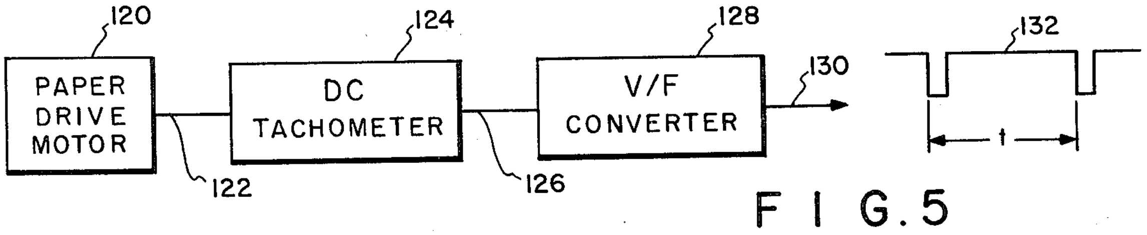
FIG. 5 is a block diagram of a circuit to produce a pulse every time the paper moves a predetermined distance.

FIG. 5 shows a block diagram of a circuit for producing a series of pulses in accordance with paper speed. In FIG. 5, the paper drive motor is shown as a box 120 connected by a conductor 122 to a DC tachometer 124. As the motor 120 drives the recording medium, the tachometer 124 produces an output on a conductor 126 which varies with the speed of motor 120. The output on line 126 is connected to a voltage to frequency converter 128 whose output on a conductor 130 will be a series of pulses such as is shown by the curve 132 just below output 130 in FIG. 5. The time t between the leading edges of consecutive pulses can be set by adjusting the circuit so that each time a pulse occurs, resulting in a dot being placed upon the recording medium, a predetermined distance wil have been traveled by the recording paper. Circuitry, to be described below, receives the signal from line 130 and operates to cause the signals to be presented to the stylus 20 of FIG. 1 or its counterpart in FIG. 2 every time a pulse occurs.

Figure 6:
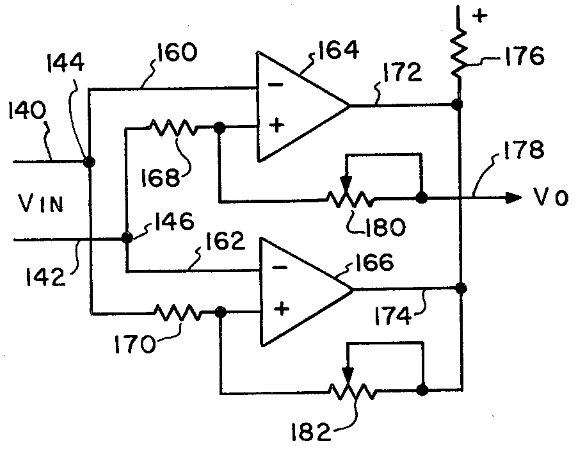
FIG. 6 is a schematic diagram of a circuit to monitor the rotating magnet and produce an output for use in discriminately allowing writing.
Figure 7:
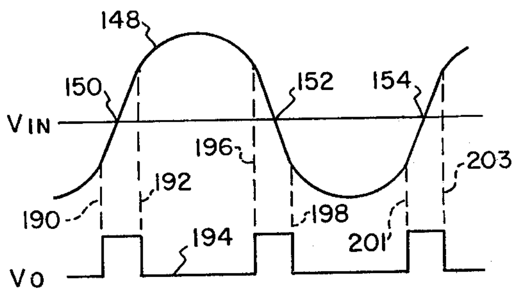
FIG. 7 is a graph showing the input and output waveforms for FIG. 6.

It may occur that from time to time an output pulse on line 130 will occur when the toner tree 22 in FIG. 1 or 48 in FIG. 2 is lying down and this is an undesirable situation. To avoid this, a signal occurring during that time period may be delayed until the proper time when the tree is standing up before recording occurs. FIG. 6 shows a circuit which will produce a signal whenever it is not possible to record and this signal will be used by a circuit to be later described to delay the signal to the stylus until writing can occur. In FIG. 6, input connections 140 and 142, between which a voltage input $V_{IN}$ is presented, are connected to junction points 144 and 146 respectively. The input voltage $V_{IN}$ between lines 140 and 142 is that from the hall effect sensor and will have a generally sinusoidal shape such as shown as curve 148 in FIG. 7. It should be noted that in areas around the zero cross over points 150, 152 and 154 the toner tree will be lying down and recording will not be possible. In FIG. 6, the input terminals 144 and 146 are connected by conductors 160 and 162 to the negative inputs of comparators 164 and 166 respectively. The input terminals 144 and 146 are also connected through resistors 168 and 170 respectively to the positive input terminals of comparators 164 and 166 respectively. It should be noted that whenever $V_{IN}$ is near zero voltage, the inputs to comparators 164 and 166 are nearly the same and in this case the output of comparators 164 and 166 will be high. The output of comparators 164 and 166 on conductors 172 and 174 respectively are connected through a resistor 176 to a source of positive potential and to the circuit output on conductor 178 represented as $V_O$. It is seen that when both of the outputs of comparators 164 and 166 are high, as occurs around the zero crossover point of $V_{IN}$, the signal on circuit output 178 will be high. This high signal represents the portion of the cycle when writing cannot occur. The signal on the output conductors 172 and 174 of comparators 164 and 166 are fed back through variable resistors 180 and 182 respectively to the positive input terminals of comparators 164 and 166 respectively. Resistors 180 and 182 are adjusted to control the duration of the high output $V_O$ which is dependent on the amount of time that the toner particles are lying down and the apparatus cannot write. More particularly, as shown in FIG. 7, the dashed lines 190 and 192 represent an area around the zero cross over point 150 in which it is desired not to write. It will be seen that $V_O$, shown by curve 194 in FIG. 7, is high between the two dashed lines 190 and 192. Likewise, around zero cross over point 152, dashed lines 196 and 198 show the area in which writing cannot occur and it is seen that the output $V_O$ is high between these dashed lines also. In similar fashion, the zero cross over point 154 is surrounded by dashed lines 201 and 203 representing the area in which writing is not to occur and the output $V_O$ is shown to be high during this time also.

When $V_{IN}$ is other than near zero, as for example when the signal at junction point 144 is higher than that at junction point 146, then the output of comparator 164 will be low and even though the output of comparator 166 will be high, $V_O$ will become low because of the connection from conductor 178 to conductor 172. On the other hand, if terminal 146 becomes greater than terminal 144, the output of comparator 166 will swing low and even though the output of comparator 164 is high, $V_O$ will remain low by virtue of the connection from conductor 178 to the conductor 174. Accordingly, the apparatus of FIG. 6 will produce an output $V_O$ which goes high only during the times that recording is not possible because the toner particles are lying down.

Figure 8:
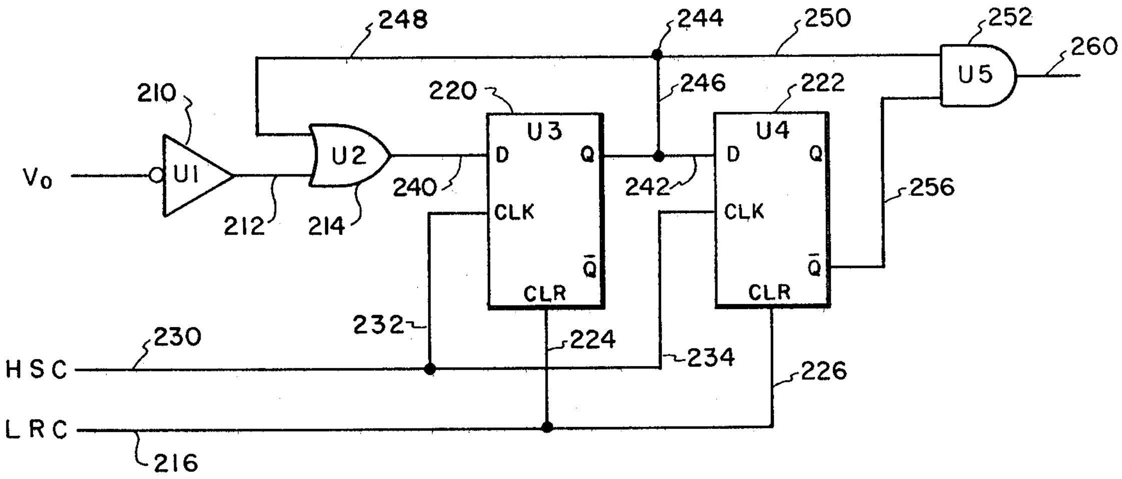
FIG. 8 is a block diagram of a synch circuit used for generating write commands.

FIG. 8 shows a circuit for producing the "write" signals in normal operation and the delaying of any "write" signal which occurs during a time when writing is not possible due to lying down toner particles.

In FIG. 8, the output $V_O$ from FIG. 6 is shown as an input to an inverter 210 labeled "U1". As will be recalled, $V_O$ is a signal having positive pulses whenever writing by the recorder is not to be permitted. Inverter 210 operates to invert the signals so that the signal on a conductor 212 will be positive during normal operation but will swing negative when recording is not to be permitted. The signal on conductor 212 is presented as one input to an OR gate 214 labeled "U2". A conductor 216 is shown in FIG. 8 receiving a signal from the line rate clock identified by the letters LRC. The signal on line 216 is the same as the signal on conductor 130 in FIG. 5 and consists of a series of negative going pulses whenever it is desired to produce a "write" signal to the stylus 20 of FIG. 1 or its counterpart in FIG. 2. The line rate clock signal on conductor 216 is presented to the "clear" input terminals of a pair of flip-flops 220 and 222, labeled "U3" and "U4" respectively, by conductors 224 and 226 respectively. A conductor 230 in FIG. 8 has an input thereon consisting of a series of pulses from the high speed clock of the system identified by the letters HSC. These pulses occur at 50 kilohertz rate whereas the line rate clock signals range from less than one hundred hertz to 50 kilohertz The high speed clock signals on conductor 23 are presented to the clock inputs of flip-flops 220 and 222 by conductors 232 and 234 respectively.

The D input of flip-flop 220 is connected to the output of OR gate 214 by a conductor 240 and the Q output of flip-flop 220 is connected to the D input of flip-flop 222 by a conductor 242 and to a junction point 244 by a conductor 246. Junction point 244 is connected by a conductor 248 to the upper input of OR gate 214 and by a conductor 250 to the upper input of an AND gate 252 labeled "U5". The $\overline{Q}$ output of flip-flop 222 is connected by a conductor 256 to the lower input of AND gate 252 and the output of AND gate 252 is shown on a conductor 260 which signal will lead to the stylus 20 of FIG. 1 or its counterpart in FIG. 2 as the signal to produce writing.

Figure 9:
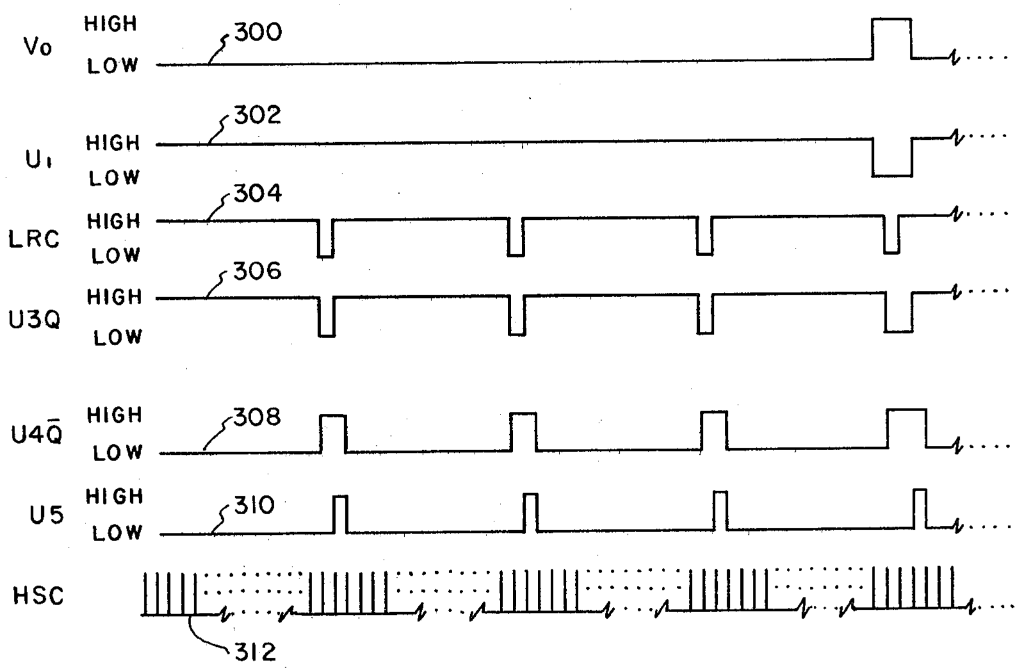
FIG. 9 is a graph showing the relationship between various input and output signals of FIG. 8.

The operation of FIG. 8 can best be understood with reference to the graphs of FIG. 9 in which a first curve 300 represents the signal $V_0$ going from a low to a high value when it is desired to prevent writing; a second curve 302 represents the signal at the output of inverter 210 in FIG. 8 which is seen to go from a high value to a low value at the same time that $V_0$ goes from a low value to a high value; a third curve 304 represents the line rate clock signals going from a high value to a low value each time it is desired to produce a dot on the recording medium; a fourth curve 306 represents the Q output of flip-flop 220 in FIG. 8; a fifth curve 308 represents the $\overline{Q}$ output from flip-flop 222; a sixth curve 310 represents the outputs of AND gate 252 of FIG. 8 and thus represents the write commands to be presented to the styli of the recorder; and a curve 312 represents the high speed clock signals which occur very rapidly with respect to the other signals involved in FIG. 9 and are the signals presented on line 216 of FIG. 8.

Under normal operating conditions, when writing is desired, the signal $V_0$ will have a low value and accordingly the output of inverter 210 will have a high value. Because of this, the output of OR gate 214 will be high and the input to the D terminal of flip-flop 220 will also be high. Accordingly, after the next clock pulse has occurred on line 232, the output on the Q terminal of flip-flop 220 will be high and this signal will be presented to the AND gate 252 and to the D input of flip-flop 222 as well as the other input of OR gate 214. With the high signal on the D input of flip-flop 222 after the next clock pulse has occurred on line 234, the output on the $\overline{Q}$ output of flip-flop 222 will be low and this signal is presented as the other input to AND gate 252. With a high and a low signal as inputs to AND gate 252, the output on line 260 will be low. This situation continues until a signal appears on line 216 indicating the desirability for a write signal. The signal on line 216 is a negative going signal which is presented to the "clear" terminals of flip-flops 220 and 222 thereby changing the Q output of flip-flop 220 to a low value and the $\overline{Q}$ output of flip-flop 222 to a high value. This does not change the output of AND gate 252 since it is still receiving one low and one high value from flip-flops 220 and 222. When the line rate clock signal goes back to high on line 216, since the D input to flip-flop 220 is still high, the Q output of flip-flop 220 will go back to high at the next clock pulse on line 232. This causes the D input to flip-flop 222 to go back to high and after the next clock pulse on line 234, the $\overline{Q}$ output from flip-flop 222 will go back to low. However, during the time between the Q output of flip-flop 220 going high and the next succeeding clock pulse causing the $\overline{Q}$ output of flip-flop 222 to go low, both inputs to AND gate 252 are high and accordingly the output on conductor 260 will be high and one write command will have been sent to the styli of the recorder. In similar fashion, each time a line rate clock signal appears on line 216, the apparatus works as described above to produce an output signal on line 260 and cause a write signal to occur. The exception to this occurs when the $V_0$ signal changes from a low to a high value indicating that it is desirable to delay the signal and not write because the toner particles are lying down. With the Q output of flip-flop 220 high and the $\overline{Q}$ output of flip-flop 222 low, a change of $V_0$ from low to high will cause the signal on line 212 to change from high to low. However, the output of OR gate 214 will not change since the connection 248 still presents a high signal thereto and accordingly the D input of flip-flop 220 will remain high. The Q output of flip-flop 220 will remain high and the $\overline{Q}$ output of flip-flop 222 will remain low. If now a line rate clock signal appears on line 216 while $V_0$ is still high, the Q output of flip-flop 220 will go low while the $\overline{Q}$ output of flip-flop 222 will go high. With the Q output of flip-flop 220 low and the output of inverter 210 low, OR gate 214 receives two low signals and accordingly the D input of flip-flop 220 goes low. Now when the line rate clock goes back to a high value, the D input to flip-flop 220 stays low and the Q output of flip-flop 220 stays low. So therefore, the $\overline{Q}$ output of flip-flop 222 stays high. With a low and a high signal on the inputs of AND gate 252, a low signal appears on conductor 260 and no writing occurs. This condition continues to exist until the signal $V_0$ goes back to a low value indicating writing can again occur at which time the output of inverter 210 goes back to a high value and the D input to flip-flop 220 goes back to a high value so that the next time a clock signal occurs on line 232, the Q output of flip-flop 220 will go high and on the next succeeding clock input on line 234, the $\overline{Q}$ output of flip-flop 222 will go low. However, between the time that the D input to flip-flop 222 went high and the next succeeding clock input, both inputs to AND gate 252 will be high and accordingly the output on line 260 will be high indicating a write command at the end of the $V_0$ positive pulse.

Accordingly, it is seen that the write command in FIG. 8 is delayed until it is possible to write. As explained above, this may displace the desired dot position on the paper but when overlapping writing is being used, no gap in the trace will result. Accordingly, writing speed is increased to an even further extent.

It is therefore seen that we have provided apparatus for allowing increased writing speed in an electrographic recorder. Many obvious changes will occur to those skilled in the art and we do not intend to be limited to the specific disclosures used in connection with the description of the preferred embodiments. We intend only to be limited by the following claims.

The embodiments of the invention in which an exclusive property or right is claimed are defined as follows:

1. In an electrographic recorder which includes a rotating magnet, magnet toner particles which cyclically stand up and lie down as the magnet rotates, and recording medium movable near the toner particles so that the toner particles touch one side of the medium over a small area when the particles stand up, enabling recording, and do not touch the medium when the particles lie down, preventing recording, the improvement comprising:

a magnetic member having a size in the order of the size of the small area; and means mounting the member proximate the small area but on the side of the medium opposite the one side, the member operating to cause the toner particles to stand up for a significantly greater portion of the cycle than they lie down.

2. Apparatus according to claim 1 wherein the toner particles stand up to touch one side of the medium in a plurality of individual small areas and a magnetically permeable member is positioned proximate each small area on the side of the medium opposite the one side.

3. Apparatus according to claim 2 wherein the magnetic member is a single strip.

4. Apparatus according to claim 1 wherein the magnetic member is an electromagnet.

5. Apparatus according to claim 4 further including a function generator to supply a signal to energize the electromagnet in a predetermined manner.

6. Apparatus according to claim 5 further including monitoring means mounted near the rotating magnet to produce a signal indicative of the position of the electromagnet and means connecting the monitoring means to the function generator.

7. Apparatus according to claim 6 wherein the signal from the monitoring means is a sine wave and the function generator produces a signal which drives the electromagnet in such a manner that the magnetic field between the rotating magnet and the electromagnet varies as an approximate square wave.

8. In an electrographic recorder including a rotating magnet, recording medium located near the magnet, magnetic toner which has a "stand up" and "lie down" condition near the recording medium as the magnet rotates, the magnetic toner touching one side of the recording medium when it is in the "stand up" condition, the improvement comprising:

means monitoring the rotation of the magnet to produce a first signal indicative of the "stand up" and "lie down" condition of the toner;

an electromagnet mounted on the side opposite the one side of the recording medium, the electromagnet, when energized, causes the toner to be in the "stand up" condition for a greater time than when de-energized.

9. Apparatus according to claim 8 further including function generating means connected to receive the first signal and to produce a second signal which, if added to the first signal, produces an approximate square wave; and means connecting the electromagnet to the function generating means so that the second signal operates to energize the electromagnet.

10. Apparatus for use with an electrographic recorder having a rotating magnet, recording medium moveable near the magnet, magnetic toner between the magnet and the medium, the toner alternately having a "stand up" condition and a "lie down" condition as the magnet rotates, when in the "stand up" condition, the toner touching the medium, and signal generating means mounted proximate the toner and operable to produce a signal which, when the toner is in the stand up condition, causes some of the toner to remain on the medium, comprising:

monitoring means mounted near the magnet to produce a first signal indicative of the "stand up" and "lie down" conditions of the toner;

delay means connected to the signal generating means and to said monitoring means and operable to delay any signal from the signal generating means which occurs during the "lie down" condition of the toner until the next "stand up" condition of the toner occurs.

11. Apparatus according to claim 10 further including a clock signal source and a "write" signal source producing a pulse when it is desired to "write" and wherein the delay means comprises an inverter connected to receive the first signal and produce an output;

an OR gate having a first input connected to the output of the inverter, having a second input and having an output;

a first flip-flop having a D input connected to the output of the OR gate, having a clock input connected to the clock signal source, having a "clear" input connected to the "write" signal source and having a Q output connected to the second input of the OR gate;

a second flip-flop having a D input connected to the Q output of the first flip-flop having a clock input connected to the clock signal source, having a "clear" input connected to the "write" signal source and having a $\overline{Q}$ output; and an AND gate having a first input connected to the Q output of the first flip-flop, a second input connected to the $\overline{Q}$ output of the second flip-flop and having an output which produces a pulse for every "write" pulse unless the first signal indicates the toner is in a "lie down" condition in which event the output of the AND gate is delayed until the first signal indicates the toner is in a "stand up" condition.

* * * * *